Oct. 4, 1966 C. B. HEARD, JR 3,277,225
METHODS AND APPARATUS FOR MULTIPLE EXTRUSION OF PLASTICS
Filed Feb. 13, 1963

INVENTOR.
C.B. HEARD JR.
BY S. Gundersen
ATTORNEY

United States Patent Office 3,277,225
Patented Oct. 4, 1966

3,277,225
METHODS AND APPARATUS FOR MULTIPLE EXTRUSION OF PLASTICS
Charles B. Heard, Jr., Greenbelt, Md., assignor to Western Electric Company, Incorporated, New York, N.Y., a corporation of New York
Filed Feb. 13, 1963, Ser. No. 258,252
2 Claims. (Cl. 264—174)

This invention relates to improved methods and apparatus for multiple extrusion of plastics having different plasticizing temperatures whereby the burning of a relatively low temperature material in a multiple extrusion head is substantially eliminated.

In the manufacture of conductors having a plurality of coats of insulation thereon, it is frequently necessary to extrude plasticized insulating materials into a common extrusion head wherein the materials are maintained at different temperatures. In addition, the extruders, which individually plasticize and extrude the different materials, are attached to the common head. Due to the relative positioning of the extruders to the extrusion head, and also to the feeding of the insulating materials at the different temperatures into the extrusion head, a heat transfer from the extruders and the material to the head subjected the extrusion head to the high temperatures, whereby burning of the materials extruded at a lower temperature occurred within the extrusion head. The extrusion head then became clogged with charred material and the insulated conductor was produced with inherent defects therein. In addition, the relative closeness of the extruders to the extrusion head frequently resulted in barrel expansion of the extruders in view of the heat transfer problem.

It is, therefore, an object of this invention to provide improved methods and apparatus for extruding a plurality of coats of insulation on a conductor whereby the burning of the insulation material during the extrusion process is substantially eliminated.

In the extrusion of polyethylene as a high temperature material and polyvinyl chloride as a low temperature material, it was discovered that once the polyethylene was plasticized at a relatively high temperature, the plasticized material could be cooled and still be maintained in a workable and extrudable condition. Hence, with the above object in view, the present invention contemplates improved methods and apparatus for extruding a plurality of insulation coats about a conductor wherein previously experienced undesirable burning of the low temperature insulation materials during the extrusion process is substantially eliminated.

As a result of the discovery that polyethylene is extrudable at a temperature lower than the temperature required to plasticize the material, the extruder in which the polyethylene is plasticized is spaced from the common extrusion head, whereby the heat transfer from the high temperature extruder to the extrusion head is limited in heating the head to a temperature below the temperature of the extruder. In addition, the polyethylene is extruded through a heat exchanger and into the extrusion head whereby the temperature of the material which is extruded from the high temperature extruder is reduced considerably thereby but the material is still maintained in a workable condition. Thus it is seen, that the spacing of the high temperature extruder and the cooling of the material as it passes through the heat exchanger limits the heat transfer to the extrusion head whereby the head is heated to a temperature appreciably below the high temperature so that burning of the polyvinyl chloride is substantially eliminated. It is further noted that the separation of the extruders in a manner in accordance with the invention substantially eliminates the problem of barrel expansion which resulted from the relative closeness of the extruders and the extrusion head.

Other objects and advantages of the invention may be apparent from the following detailed description of a specific embodiment thereof when read in conjunction with the accompanying drawings wherein.

In the past, a dual extrusion head has been attached directly to the pair of extruders for manufacturing multi-coat insulated conductors. Polyethylene, requiring a plasticizing temperature of approximately 420° F., was fed through one extruder into the extrusion head, while polyvinyl chloride, requiring plasticizing temperatures of approximately 350° F., was fed from the other extruder into the extrusion head. Due to the direct attachment of the extrusion head to the polyethylene extruder, and also to the direct feeding of the plasticized polyethylene into the extrusion head, the head was heated to a temperature substantially above that required to plasticize polyvinyl chloride. Therefore, burn out of the polyvinyl chloride would occur, resulting in a deficient product and the necessity of shutting down the line to clean out the charred bits of polyvinyl chloride from the extrusion head.

Figure 1:
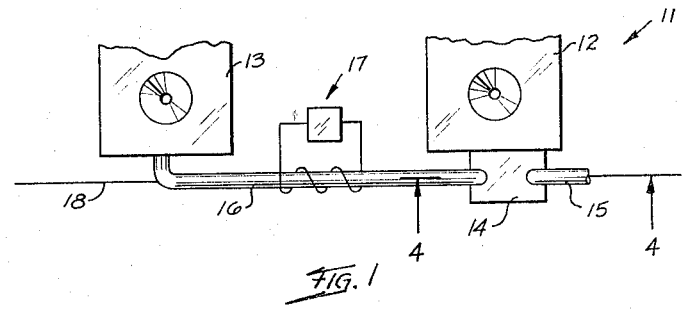
FIG. 1 is a top view of a pair of extruders connected to an extrusion head in accordance with the invention.
Figure 2:
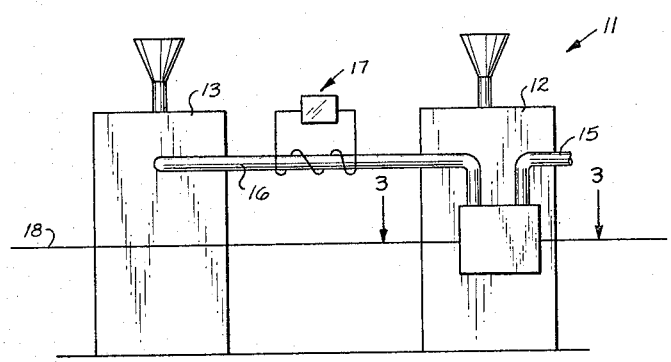
FIG. 2 is a front view of the apparatus as shown in FIG. 1.
Figure 3:
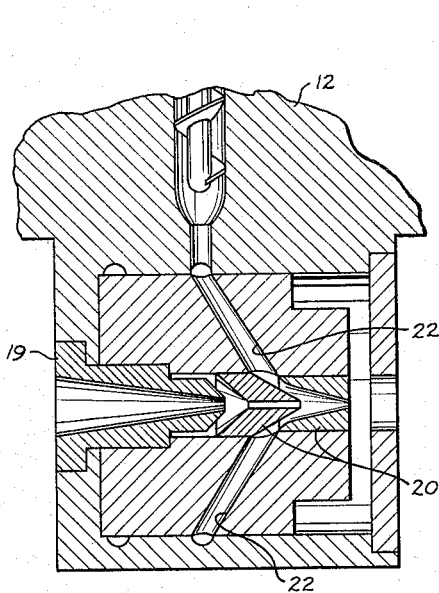
FIG. 3 is a sectional view taken along line 3—3 of FIG. 2 showing a streamlined dual extrusion head attached directly to one of the extruders for feeding material into the head.
Figure 4:
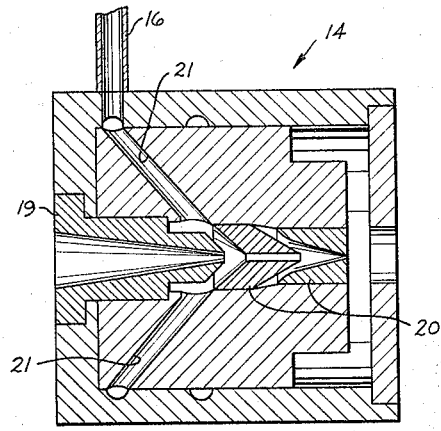
FIG. 4 is a sectional view taken along line 4—4 of FIG. 1 showing the portion of the streamlined dual extrusion head connected to a heat exchanger for feeding plasticized material into the head.

In order to overcome the burn out feature of the previously described system, a multiple extrusion apparatus 11, as shown in FIGS. 1 and 2, was developed wherein a plurality of extruders, such as a pair of extruders 12 and 13, are spaced from each other. As shown in FIGS. 3 and 4, a common extrusion head 14 having a core tube 19 and a pair of dies 20, is formed with streamlined inlets 21 and 22. The head 14 is attached directly to the extruder 12, as viewed in FIG. 3 while the outlet of the extruder 13 is connected to the extrusion head 14 through a heat exchanger 16, as viewed in FIG. 4, thereby isolating the extruder 13 from the head 14 and cooling substantially the polyethylene as it passes through the heat exchanger to reduce the effect of the heat transfer. In addition, the heat exchanger 16 is provided with a heating device 17 for controlling the temperature of the material which remains in the heat exchanger during a shut-down period. As shown in FIGS. 1 and 2, a second heat exchanger 15 extends from the extrusion head 14 and is connected to another extruder (not shown). In this manner, a plurality of different plastic materials can be fed into a common extrusion head wherein the heat transfer from the various extruders to the extrusion head is limited in view of the use of the heat exchangers in accordance with the principles of the invention. However, for the purposes of description, the common extrusion head 14 is shown as a dual extrusion head in FIGS. 3 and 4.

In operation, as a bare conductor 18 is passed through the core tube 19 and the pair of dies 20, the polyethylene, which has a plasticizing temperature of 420° F., is extruded from the spaced extruder 13 into the heat exchanger 16 and subsequently into the extrusion head 14 through the streamlined inlets 21. Further, the polyvinyl chloride, which has a plasticizing temperature of 350° F., is extruded from the extruder 12 directly into the extrusion head 14 through the streamlined inlets 22. Due to the spacing between the extruder 13, which is operating at a temperature of 420° F., and the extrusion head 14, the heat transfer from the extruder 13 to the head 14 is limited and has a comparatively small affect on the extrusion head so that the head is not heated to a temperature appreciably above the plasticizing temperature of the polyvinyl chloride. In addition, the passage of the extruded polyethylene through the heat exchanger 16 cools the flowing polyethylene to a temperature below that required to plasticize the polyethylene whereby the heat transfer from the polyethylene to the head 14 is substantially lower than the heat transfer under the previous conditions wherein the extruder 13 was attached directly to the head 14. It is to be noted that even though the polyethylene is cooled as it passes through the heat exchanger 16, the material is still maintained at a temperature wherein the material is in an extrudable condition. In the event the extrusion system is stopped for a period, the heater 17 maintains the heat exchanger at a desired temperature in order to maintain the polyethylene in a plasticized and easily flowable condition. The necessity of such a heater is dependent upon the length of heat exchanger 16.

The extrusion head 14 is directly attached to the extruder 12 which is operating at a temperature of 350° F., therefore, the extrusion head 14 is heated by the heat transfer from the extruder 12 to a temperature substantially equal to the extruder temperature but is further heated to a temperature above 350° F. due to the limited effect of the heat transfer from the spaced extruder 13 and the polyethylene material which is being extruded into the head. However, the temperature of the extrusion head 14 is maintained at a sufficient level to keep the polyethylene in a plasticized condition until the polyethylene is extruded onto the conductor 18. In additive, the head 14 does not become overheated relative to the temperature required to plasticize the polyvinyl chloride and, therefore, burn out of the polyvinyl chloride is substantially eliminated. In this manner, a continuous operation is maintained and a product having the desired properties of polyethylene and polyvinyl chloride extruded thereon is manufactured thereby. Thus, it is seen that the undesirable heat transfer effect upon the head 14 from the high temperature extruder 13 and the plasticized polyethylene flowing into the head is greatly minimized by separating the extruder 13 from the extrusion head, and by feeding the plasticized polyethylene through the heat exchanger 16 prior to entry into the extrusion head, whereby the polyethylene is cooled to a temperature somewhat below the plasticizing temperature thereof but where the material remains in a workable and extrudable condition.

It will be understood that the above-described arrangements are simply illustrative of the application of the principles of the invention. Other arrangements may be devised by those skilled in the art which will embody the principles of the invention and fall within the spirit and scope of the invention.

What is claimed is:

1. A method of extruding simultaneously at least two coats of different plastic compounds having different extrusion temperatures on a common conductive core, the extrusion temeperature of at least one of the compounds being sufficiently high with respect to the extrusion temperature of the other compound so that the compound having a lower extrusion temperature would deteriorate if subjected to a relatively high temperature to which the compound having a higher extrusion temperature is subjected during working and conditioning to permit uniform extrusion thereof, which comprises the steps of:

working and conditioning a first plastic compound having a relatively high extrusion temperature, heating the first plastic compound to a temperature required for uniform extrusion thereof at a location spaced substantially from an extrusion head to minimize the effects of heat transfer to the extrusion head so that a second plastic compound, which has a lower melting temperature than the first plastic compound and which may be in the extrusion head, is not burned or deteriorated, working and conditioning the second plastic compound having a relatively low extrusion temperature, heating the second plastic compound at a required temperature substantially lower than the required temperature of the first plastic compound and at a location spaced substantially from the location of the heating of the first plastic compound so that any heat transfer from the heating location of the first plastic compound to the heating location of the second plastic compound is insufficient to burn or deteriorate the second plastic compound, conveying the first plastic compound from the heating location of the first plastic compound to the spaced extrusion head, cooling simultaneously the first plastic compound as the compound is conveyed from the heating location of the first plastic compound to the extrusion head while maintaining the compound in an extrudable condition so that overheating and scorching is prevented of any of the second plastic compound, having a substantially lower extrusion temperature, which may be in the extrusion head, discharging the conveyed and cooled, workable, first plastic compound into the extrusion head through a first passage and a first extrusion chamber of the extrusion head in a sufficiently fluid state for smooth and uniform extrusion of the first compound in a coating about the conductive core passing through the first chamber, discharging the worked and conditioned second compound directly from the heating location of the second compound through a second passage and a second chamber of the extrusion head in a sufficiently fluid state for smooth and uniform extrusion about the first plastic coating extruded onto the conductive core, and heating the conveyed first plastic compound during a period when the two coats of different plastic compounds are not being extruded on the conductive core to maintain the first plastic compound, between the heating location of the first plastic compound and the extrusion head, in a workable condition.

2. Extrusion apparatus for extruding simultaneously at least two coats of different plastic compounds having different extrusion temperatures on a common conductive core, the extrusion temperature of at least one of the compounds being sufficiently high with respect to the extrusion temperature of the other compound so that the compound having a lower extrusion temperature would deteriorate if subjected to a relatively high temperature to which the compound having a high extrusion temperature is subjected during working and conditioning to permit uniform extrusion thereof, which comprises:

an extrusion head having an extrusion passage through which a conductive core passes, a core tube mounted in the extrusion passage of the extrusion head, a first die mounted within the extrusion passage of the extrusion head, spaced from and aligned with the core tube, a second die mounted in the extrusion passage in the extrusion head, spaced from and aligned with the first die, a first extrusion chamber formed between the core tube and the first die, a first passage formed in the extrusion head and communicating with the first extrusion chamber formed between the core tube and first die, a second extrusion chamber formed between the first die and the second die, a second passage formed in the extrusion head and communicating with the second extrusion chamber formed between the first and second dies, a first extruder for working and conditioning a first plastic compound having a relatively high extrusion temperature and heating the first plastic compound to a temperature required for uniform extrusion thereof, the first extruder being spaced from and communicating with the first passage to permit discharging of the worked and conditioned plastic compound into the extrusion head through the first passage and the first extrusion chamber in a sufficiently fluid state for smooth and uniform extrusion of the first compound in a coating about the conductive core passing through the first chamber, a second extruder for working and conditioning a second plastic compound at a required temperature substantially lower than the required temperature of the first plastic compound and for discharging the worked and conditioned second compound directly through the second passage and the second chamber in a sufficiently fluid state for smooth and uniform extrusion about the first plastic coating extruded onto the conductive core, the second plastic compound being of a type which will deteriorate when subjected to a temperature sufficiently high to cause the first plastic compound to be in a sufficiently plastic state to permit smooth and uniform extrusion thereof, the first extruder spaced from the second extruder and the extrusion head a distance sufficient to minimize the effect of the heat transfer from the first extruder to the second extruder and the extrusion head so that the compound which requires the relatively low temperature to work and condition in the second extruder and into the extrusion head is not affected by or deteriorated as a result of the relatively high temperature at which the first extruder operates in the working and conditioning of the compound in the first extruder, a conduit interconnected externally of and between the first extruder and the first passage in the extrusion head to facilitate communication between the first extruder and the first passage and for conveying the first plastic compound from the spaced first extruder to the extrusion head, the conduit being of a length and size sufficient to effect simultaneously cooling of the first plastic compound as the compound passes through the conduit while maintaining the compound in an extrudable condition so that overheating and scorching of any of the second plastic compound, which may be in the extrusion head, is prevented as the first plastic compound enters the extrusion chamber, and heating means attached to the conduit for maintaining a desired temperature in any of the first plastic compound remaining in the conduit during a period when the extrusion apparatus is inoperative.

References Cited by the Examiner

UNITED STATES PATENTS

| | | | |
|---|---|---|---|
| 277,707 | 5/1883 | Genon | 18—13 |
| 720,902 | 2/1903 | Du Brau | 18—12 |
| 876,755 | 1/1908 | Webb | 18—13 |
| 964,550 | 7/1910 | Du Pont | 18—12 |
| 2,501,690 | 3/1950 | Prendergast | 18—13 |
| 2,687,553 | 8/1954 | Colombo | 18—13 |
| 2,930,083 | 3/1960 | Vostovich et al. | 264—174 |
| 2,977,632 | 4/1961 | Bunch | 18—13 |
| 3,112,986 | 12/1963 | Woodell | 264—174 |
| 3,121,255 | 2/1964 | Henning et al. | 18—13 |
| 3,143,583 | 4/1964 | Haugwitz | 18—13 XR |

FOREIGN PATENTS

| | | |
|---|---|---|
| 455,025 | 3/1949 | Canada. |
| 869,549 | 5/1962 | Great Britain. |
| 995,743 | 10/1951 | France. |

WILLIAM J. STEPHENSON, *Primary Examiner.*

J. SPENCER OVERHOLSER, ALEXANDER H. BRODMERKEL, *Examiners.*

F. MARLOWE, L. S. SQUIRES, *Assistant Examiners.*